ELECTROFORMING APPARATUS INCLUDING AN ANODE HOUSING WITH A PERFORATE AREA FOR DIRECTING ION FLOW TOWARDS THE CATHODE

Original Filed Oct. 22, 1969

INVENTORS
HERBERT M. BOND
CHARLES E. RING
BY Kinney, Alexander, Sell, Steldt & De La Hunt
ATTORNEYS United States Patent Office 3,809,642

Patented May 7, 1974

3,809,642

ELECTROFORMING APPARATUS INCLUDING AN ANODE HOUSING WITH A PERFORATE AREA FOR DIRECTING ION FLOW TOWARDS THE CATHODE

Herbert M. Bond, Stillwater, and Charles E. Ring, Lake St. Croix Beach, Minn., assignors to Buckbee-Mears Company, St. Paul, Minn.

Continuation of abandoned application Ser. No. 868,390, Oct. 22, 1969. This application Oct. 28, 1971, Ser. No. 193,528

Int. Cl. C23b 5/68

U.S. Cl. 204—275 1 Claim

ABSTRACT OF THE DISCLOSURE

A method and device are provided for the precision electro deposition of metals by electroforming. The electroformed product can be made with metal deposition thickness controlled within ±10% on deposits as thin as 0.005 mm. The method comprises directing and controlling the flow of metal ions from the anode ion donor to the cathode ion receptor by means of a unique ion flow directing system comprising an anode and a dielectric nonporous perforate ion-flow directing device which proximately and spacedly surrounds the anode, thereby allowing the flow of the electrolytic solution about the entire area of the anode and directing such flow of ion rich electrolyte in a relatively undiffused path to the cathode.

In another aspect, the invention discloses a precision electrical circuit made by the utilization of the process indicated above.

This is a continuation of application Ser. No. 868,390, filed Oct. 22, 1969, and now abandoned.

This invention relates to electroforming and more particularly relates to a method and means for improving the process of electroforming. In one aspect the invention comprises a unique method of directing the bulk of the metal ion flow from the anode to the desired pattern or area of the deposition on the cathode. As a result, electroforming can be used for the production of extremely delicate, thin layered precision items, such as fine line precision printed circuits. In another aspect, the invention comprises fine line printed circuits produced by the method. The invention also provides an ion-flow directing system for controlling the path of ion flow from the anode. This system permits control of the size, direction, and number of the electrolyte streams, and the force of their propulsion from the anode to the cathode. The invention also provides precision electrical circuits of extremely uniform thickness.

Heretofore, the formation of thin-lined printed circuits has been accomplished by an etching process wherein a metal surfaced dielectric substrate provided with a photosensitive coating over the metal is exposed to the circuit pattern to "print" the pattern on the coating. Such exposure renders the coating in the "printed" area of opposite solubility to that of the remainder of the coating whereby either the exposed pattern or the unexposed area of the coating may be washed off in a solvent in which the other portion of the coating is insoluble. After removing the soluble portion of the coating, the metal thereunder is etched from the substrate leaving the desired printed circuit underlying the remaining portion of the coating. The coating is then removed.

There are disadvantages inherent in the etching process. When etching is used to make printed circuits, the coating, exposure and etching steps must be repeated for each circuit unit made. Further, etching has a tendency to produce "bridging," i.e., localized metal deposits bridging the spaces between circuit lines and rendering the circuit useless. The "bridging" effect is especially prevalent when extremely fine circuits are made.

The present invention provides an improved electroforming process which is capable of producing extremely fine patterned printed circuits of a kind which are now produced only with difficulty, if at all, by conventional etching processes.

Electroforming is usually considered a special branch of electroplating, differing therefrom in that it involves a relatively weakly aldherent electrodeposition of metal on a master (cathode) for subsequent separation therefrom. The deposited metal then becomes an independent entity, e.g., a printed circuit.

In all electroplating (other than electroless plating), an electroplating bath is provided in which at least one anode and one cathode are suspended with an electromotive force applied therebetween so that metal ions from the anode are carried by the electrolyte forming the bath to the cathode. In conventional electroplating there results a thin adherent metal coating on the cathode, the coated cathode being the end product of the electroplating.

Electroforming has certain unique capabilities in that complicated shapes can be readily duplicated, physical and mechanical properties of the electroformed metals can be closely controlled and the surface contour of the cathode area upon which the metal is to be deposited can be exactly reproduced down to the finest detail. Further, physical and mechanical properties of the electroformed metals may be closely controlled in electroforming. Thus, electroforming has been used when these particular capabilities are needed.

In electroforming the cathode master is either destroyed in the separation of the electroformed part therefrom or is reused for the formation of further electroformed parts thereafter depending on the parts being formed. In the use of the process for making printed circuits and other similar readily separable parts, the cathode master is used as a permanent pattern, assuring precise reproduction, and eliminating the costly and laborious steps involved in making a new cathode for each circuit produced.

While electroforming has been used in the past to make such articles as printed circuits, there have been difficulties encountered in electroforming narrow, closely spaced lines of metal in which the circuit lines may be as little as 0.005 mm. thick. There are several reasons for these difficulties. For example, across the width of the circuit, particularly in patterned circuits with very closely spaced very narrow lines, a higher voltage gradient is present along the edges of the line patterns of the cathode matrix. This gradient causes the metal to deposit non-uniformly, deposition at the edges around the circuit perimeter being as much as eight times as thick as the metal deposited on the printed pattern toward the center of the circuit. Further, as the metal deposits grow thicker, they tend to spread beyond the initial line of deposit so that the circuit lines tend to be wider at the top than at the base, resembling in cross section, inverted, truncated isosceles triangles. This spreading may result in electrical interference between adjacent line patterns, which in a very fine patterned circuit such as one used in a computer memory plane, for example, results in an unusable circuit.

Some work has been done in the past in dealing with the problems of lack of uniformity of plating in the formation of printed circuits by electroplating. One technique is to mask the edge areas of the cathode by placing a screen having openings therein for the flow of ionized electrolyte to those areas of the cathode to be plated. The mask must be perfectly aligned, however, because even a slight misalignment will produce a relatively great deviation in the deposition. The configuration of the openings of the mask is extremely important also and it usually takes many attempts to achieve the proper configuration during the manufacture of the mask.

Another technique used has been to utilize a device known as a "robber." The robber is, in essence, an auxiliary cathode of larger area than the cathode which forms the template for the circuit. The robber is aligned behind the cathode thereby drawing off some of the disproportionately high level of deposition occurring at the edges of the cathode. Thickness of coating on the primary cathode is thus controlled to some extent. A higher current density and/or larger anode area, however, is required for the robber to be effective which may produce undue oxidation of the anode with an accompanying drastic loss in efficiency. Further, metal deposited on the auxiliary cathode must be taken into account in the process because such metal is not part of the final circuit. Also, as the metal builds up on the robber, the robber becomes distorted. The process must then be stopped and the robber replaced.

While the combination of a cathode mask and auxiliary cathode has also been used, neither of these techniques nor their use in combination, has resulted in an electroforming process capable of the precision electroforming provided by this invention.

The present invention provides an electroforming method which is capable of much greater control of the electrodeposition of metal than has been possible in the past by the use of electroforming methods. While this new electroforming method is sufficiently precise to electrodeposit intricate printed circuits on masters in the production of very high quality flexible printed circuits, it is also useful for other products and, therefore, vastly expands the useful scope of electroforming.

In the practice of this new method, a metal anode and a template or master which forms a cathode upon which metal is to be deposited are suspended in spaced relation to one another in an electroplating bath and an electromotive force of the desired current density is applied to cause the deposition of metal from the anode onto the cathode. The anode is surrounded in spaced but proximate relation thereto with a dielectric, nonporous ion-flow directing device having a perforate area. There is provided sufficient space between the anode and the device to allow the electrolyte to uninterruptedly contact the entire area of the anode. The electrolyte flow is then directed from the anode through the perforate area of the ion directing device toward the cathode with the perforate area being closely correlated with the overall area of the cathode to be plated. This correlation provides an ion-bearing stream of electrolyte from the anode to the cathode no greater in size than desired and of the desired configuration for the cathode to be plated. The electroplated cathode master is then removed from the solution and the electroformed produce is separated therefrom.

The even plating throughout the cathode area provided by this method is unique. The plating thickness of lines at the cathode edges is approximately the same as that of lines toward the center of the cathode. While we wish to be bound by no theory, as the operability of the method is evident from its practice, it is believed that the ion path from the anode through the perforate area of the device to the central portion of the cathode, which has the lowest voltage, is shortened as compared with the ion path toward the edges of the cathode where the voltage is strongest so that metal deposition thickness is essentially the same throughout the cathode.

Independent agitation of the electrolyte located between the device and the anode provides more uniform utilization and minimum oxidation of the anode. It also enables continuous filtering of electrolyte to remove unwanted precipitates. By creating positive pressure on the electrolyte located between the device and the anode, it is also possible that the ion stream through the perforate area of the device remains relatively undiffused in its passage to the cathode. Both agitation and pressure may be provided by utilizing a recirculating pump with an outlet or outlets at the desired height located between the ion-flow directing device and the anode and an inlet situated in the main body of the electrolyte.

Using the process just described, printed circuits having line widths smaller than 0.125 mm., line thicknesses less than .005 mm., and width between lines as small as about .075 mm. can be readily formed. Even with these very thin deposits the process is capable, as noted previously, of metal deposit thickness control within about ±10% of the average thickness of the deposit.

The invention provides a unique electroforming method for controlling metal deposition thickness on the cathode matrix and apparatus for carrying out the method. The invention is described in more detail with reference to the accompanying drawings wherein:

FIG. 6 illustrates the manner in which the circuit is transferred from the cathode master to a flexible backing or the like.

Figures 1, 2, 3, 4:
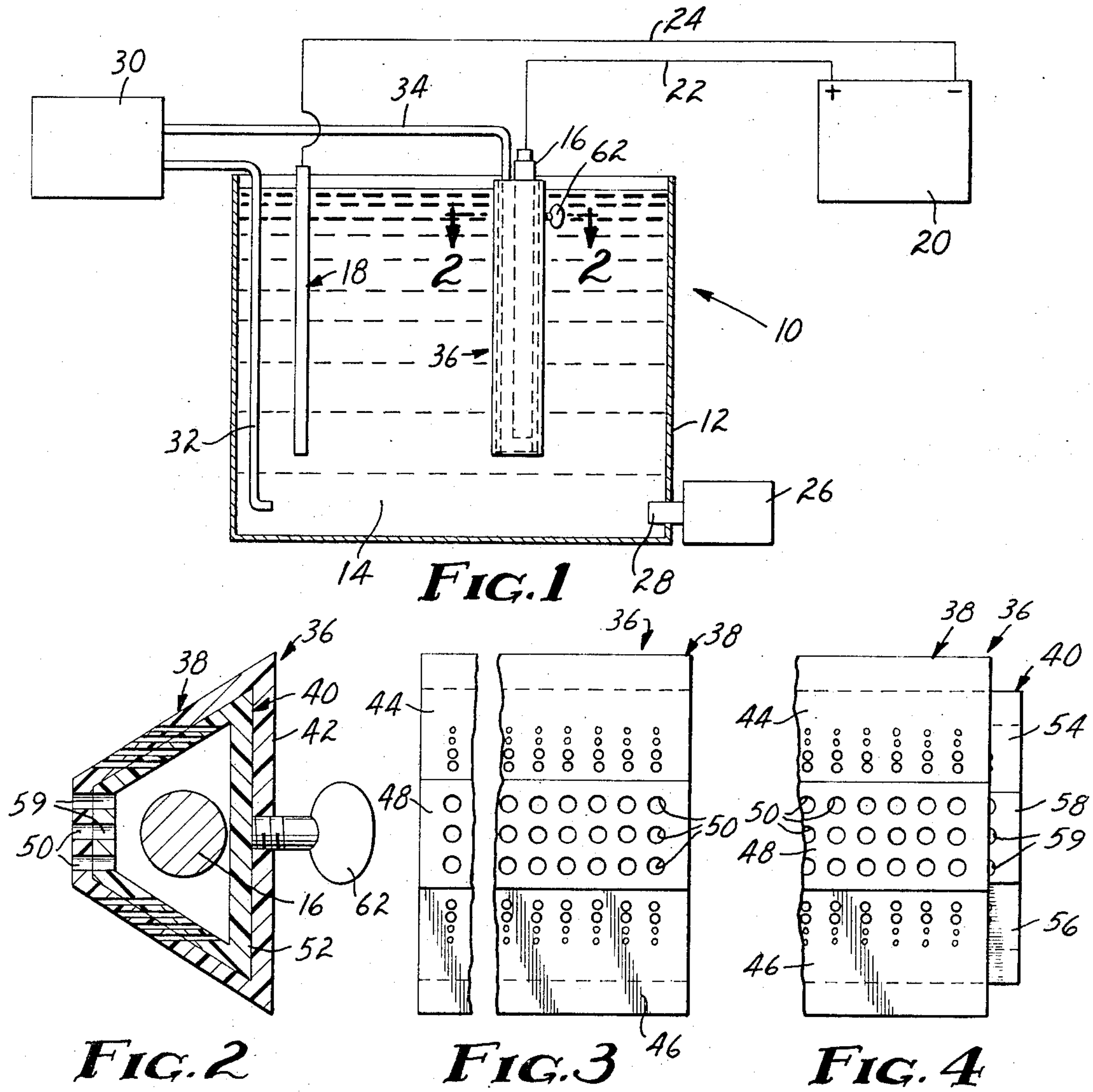
FIG. 1 is a schematic view of an electroforming apparatus for practicing the method of this invention.
FIG. 2 is a cross-sectional view of the ion-flow directing system taken substantially along the plane of section line 2—2 of FIG. 1.
FIG. 3 is a front view of the ion-flow directing device.
FIG. 4 is a front view of the ion-flow directing device illustrating the sliding relationship of the parts to change the orifice size and pattern.

Referring first to FIG. 1 there is illustrated a simplified electroforming apparatus designated in its entirely by the numeral 10. The apparatus is composed of a tank 12 containing an electrolyte 14 which in the illustrated embodiment is a liquid electroplating bath. Suspended in the electroplating bath 14 in spaced relation to one another are an anode 16 and a cathode 18, which cathode comprises a master on which metal is deposited by the electroforming process. There may be several anodes and cathodes in the electroplating bath 14; however, a single anode-cathode system is depicted for ease of illustration.

An electromotive force is supplied to the system by means of a direct current rectifier 20 having a positive lead 22 connected to the anode and a negative lead 24 connected to the cathode to provide an electromotive force for the passage of metal ions from the anode 16 to the cathode 18 through the electroplating bath 14. An air pump 26 is provided with a tube 28 opening into a bath to agitate the bath. A second pump 30 has an intake tube 32 opening into the bath toward the bottom of the tank 12 from which electrolyte is drawn and an outlet tube 34 opening into the top of an ion-flow directing device 36 spacedly surrounding the anode 16. By this means electrolyte from the main body of the bath is circulated to the electrolyte in the space surrounded by the device 36 to both agitate the solution around the anode and exert pressure on such solution to propel it through the device toward the cathode.

As illustrated in FIGS. 2 and 3, the anode 16 and the device 36 which closely but spacedly surround the anode in the bath comprise an ion-flow directing system. The device 36 illustrated is a tubular structure composed of an outer tubular body 38 within which is slidably disposed an inner tubular body 40. The particular device shown has one or more orifices therein providing a perforate area through which metal ion-bearing electrolyte is forced in discrete streams directionally aimed at the cathode 18. The embodiment of ion-flow directing device 36 illustrated is a presently preferred embodiment having the cross-sectional shape of a truncated isosceles triangle, the outer body 38 having a back wall 42, converging sidewalls 44 and 46, and a flat front wall 48. The sidewalls 44 and 46 and the front wall 48 have a plurality of passages 50 therethrough for directionally aiming streams of electrolyte from the anode to the cathode. The top of the outer body 38 of the device 36 is open and the bottom thereof is closed. The inner body 40 (FIGS. 2 and 4) is shaped as is the outer body 38 and comprises a solid back wall 52, converging sidewalls 54 and 56, and flat front wall 58. The converging sidewalls 54 and 56 and the front wall 58 of the inner body 40 have passages 59 therethrough which may be aligned with or displaced from the passages 50 of the outer body 38 by sliding the inner body 40 relative to the outer body 38. The set screw 62 threaded through the back wall 42 of the outer body 38 and engaging the surface of the back wall 52 of the inner body 40 serves to adjust the positions of the bodies 38 and 40 relative to one another as required.

The device 36 may be of any polygonal cross-sectional shape or it may be round or otherwise curvilinear in cross-section. The embodiment shown is preferred since it enables the electrolyte streams to be readily controllably directed toward a flat surfaced master and permits easy adjustment of the size of the streams. Also, if necessary, some of the passage orifices may be readily blocked off. In the event the thickness of the plating becomes too great, the orifice sizes may be reduced by sliding the inner body 40 relative to the outer body 38 to adjust the plating, as illustrated in FIG. 4. However, the device 36 may be a single closed end tube and the passages or passage therethrough designed specifically for use with a particular master, each device 36 being tailored to the master on which electroformed metal deposits are to be made.

Figure 5:
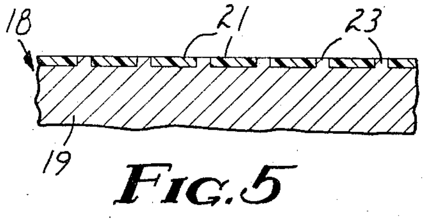
FIG. 5 is a cross-sectional view through the permanent cathode master of FIG. 1 on which printed circuits are formed in the practice of the invention.

The cathode 18, which serves as the master from which printed circuits are reproduced, has a portion thereof illustrated in FIG. 5 in greatly exaggerated detail. The plate 18 is shown as comprising a stainless steel base 19 having surface areas etched and filled with a dielectric material 21, e.g., polytetrafluoroethylene, leaving only exposed stainless steel surface islands 23 on which metal can be deposited, these islands constituting the circuit line pattern to be reproduced.

Figure 6:
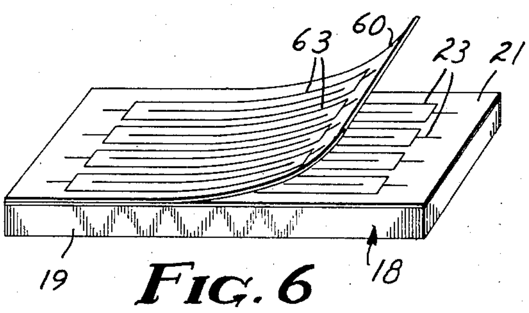
Figure 7:
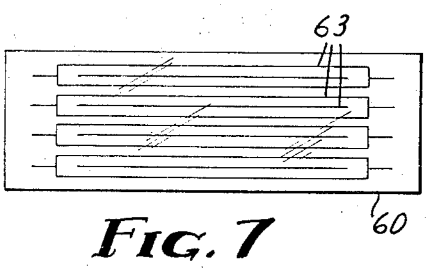
FIG. 7 is a line drawing of a representative circuit made in the practice of the invention.

In FIG. 6 the transfer of the circuit from the master 18 to a flexible backing 60 is illustrated and in FIG. 7 the completed printed circuit, composed of the backing 60 and the circuit 63 transferred from the plate 18 to the backing, is shown. The backing is preferably an electrically inert, electrical grade polymeric film of polyester, polyimide, etc. of from about .0125 to about 1 mm. thick and coated on the circuit receiving surface with a heat activatable electrical grade adhesive, e.g., epoxy, urethane, or the like. The circuit is transferred to the backing 60 by overlaying the master 18 with the adhesive surface of the backing in contact with the circuit on the master. Then, with the application of heat and pressure the circuit is transferred from the master to the backing as illustrated in FIG. 6, to form the completed flexible electroformed printed circuit of FIG. 7.

While in the apparatus shown in FIG. 1 a single anode and a single cathode are illustrated, it is to be understood that there can be a plurality of anodes and cathodes and that the process may be made continuous, e.g. by forming the cathode as an endless belt (not illustrated), with the electroformed product being separated from the belt prior to the return of the portion of the belt in which the electroformed deposit is made to the electroplatiing bath. Whether the cathode master is in the form of a single plate or in the form of an endless belt, it may be of the construction illustrated in FIG. 5.

Conventionally known electrolytic baths and anodes may be used to practice the teachings of this invention, the choice being determined by the metal to be deposited and other variables known to those skilled in the art.

The example following illustrates some of the advantages of this invention over previously known electroforming processes.

Comparisons of an electroformed circuit produced by practicing this invention were made with electroformed circuits produced by conventional electroforming techniques. One of these other circuits was made by a process used to make the circuit commercially, utilizing a properly aligned cathode mask to control the metal deposition. The other circuit was made without using a mask.

Each process was carried out using the same kind of stainless steel plate construction as the cathode master.

This master was prepared in the following manner. A photoresist polymer was coated over the face of an 0.25 mm. thick stainless steel plate. The area of the resist coating corresponded with the size of the circuit but was smaller than the plate.

A xenon lamp was used to project a negative of the circuit image on the surface of the polymer coating. The polymer was rendered insoluble in the areas subjected to light exposure. The unexposed portion of the polymer was then removed by washing with water. The exposed area of the stainless steel plate was etched to a depth of about 20% of the depth of the plate. The etched areas were then filled with polytetrafluoroethylene, as at 19, to prevent metal from depositing thereon during electroforming in the non-circuit areas of the plate.

The exposed island areas of stainless steel defined the circuit to be produced, i.e. copper deposited thereon adheres only slightly. The master was then attached to a copper plate by means of electrically insulative tape, which insulated the non-circuit areas of the master from the solution. This plate and cathode assembly was then suspended from an oscillating bar assembly (not specifically illustrated in the drawing) mounted on a 113.55 liter tank similar to that shown in the drawing. The oscillating assembly, when activated, provides for horizontal oscillation of the cathode to aid in deposition uniformity.

The copper plate to which the cathode master was attached was connected to a D.C. rectifier. A copper anode 16 was then suspended in the tank and attached to the rectifier. 106 liters of an electrolytic solution was added to the tank. The composition of the solution was as follows.

| Ingredients: | Amount by weight |
|---|---|
| Copper pyrophosphate ($Cu_2P_2O_7 \cdot 3H_2O$) | 9.98 kg. |
| Potassium pyrophosphate ($K_4P_2O_7$) | 35.6 kg. |
| Ammonium hydroxide ($NH_4OH$) (0.9 specific gravity) | 0.499 kg. |
| Pyrophosphate process brightening agent (its use is optional), "PY–61–H" (M and T Chemical Co. proprietary brightener) | 0.355 kg. |
| Pyrophosphoric acid | Added as needed during process to maintain pH at 8.3. |
| Deionized $H_2O$ | Balance. |

The conditions during plating of the samples were as follows:

| | No ion flow directing device or mask | Ion flow directing device | Mask |
|---|---|---|---|
| Electrolyte temperature, ° F | 120 | 120 | 120 |
| Amps | 2 | 2 | 2 |
| Volts | 1.5 | 1.5 | 1.5 |
| Process time, min | 48 | 48 | 48 |
| 180° turns, min | 8 | 8 | 8 |
| Sol. agitation | Yes | Yes | Yes |
| Oscillation stroke at 5 r.p.m., cm | 2.54 | 5.08 | 2.54 |
| Distance (−) to (+), cm | 5.08 | 3.8 | 5.08 |

The distances and oscillation strokes were those determined to give optimum results for each process.

The current density at the cathode was about 20,000 milliamps per square centimeter in this example for each process. Similar plating results can be achieved in each of the processes with current densities of approximately 15,000 milliamps to 80,000 milliamps per square centimeter with the electroplating bath composition used. With other baths higher or lower densities may be possible. Because with the use of the ion-flow directing device around the anode current densities are not readily calculable, this density was not determined. However, the exposed anode area in the masking process and in the unmasked process were in the neighborhood of about 10,000 to 15,000 milliamps per square centimeter. Again, higher or lower current densities could be used depending on the composition of the electroplating bath.

With all three systems, solution agitation for all of the samples was accomplished by a compressed air source located near the bottom of the tank. Every 8 minutes the current was stopped and the master turned end for end. This step is extremely important when a cathode mask is used. It is done to overcome longitudinal unevenness which may result if the cathode mask is placed too high or too low in relation to the cathode or if the aperture or apertures in the cathode mask are vertically uneven or asymmetrical. A slight difference in symmetry during deposition results in a relatively gross difference in uniformity in the circuit.

The anode was a copper cylinder about 50 cm. long and 5 cm. in diameter. It was fully exposed to the cathode in the two samples where an ion-flow directing device about the anode was not used. In all samples the electrolyte was recirculated and filtered to prevent buildup therein of contaminating solids. The ion-flow directing device used was of the type illustrated in the drawing, was disposed spacedly about the anode with the inside of the truncated face of the device spaced about 0.65 cm. from the surface of the anode facing the device (the spacing being identical along the entire length of the anode). The dimensions of the device were as follows: length about 50 cm., with of truncated face about 4 cm., width of triangle sides about 8 cm. and the diameter of perforations on the truncated front face, 0.635 cm. The diameter of the perforations in the side walls of the device varied with the largest openings being nearest to and the smallest being farthest from the truncated face. The diameters of the four different size openings varied from 0.556 cm. to 0.318 cm. in equally graduated steps. The truncated face of the device was 1.27 cm. thick and had a total perforate area of 31 cm.$^2$. Each side wall had a total perforate area of 41 cm.$^2$ and the device had a total perforate area of 113 cm.$^2$. For this example both side walls were completely masked off with tape. The truncated face was also masked equally at the top and bottom and equally at each edge so that the total perforate area of the device was less than the total area of the circuit on the cathode master.

It is generally advantageous to limit the exposed segment of the device to the central area of the polymer coated area of the cathode. More even plating results, which is, of course, in accord with the theory of operability noted earlier herein that the ion path should be shortest where the voltage at the cathode is lowest and longest where the voltage is highest.

A recirculation pump of the kind illustrated in the drawing having outlet and inlet lines disposed as illustrated in the drawing was used to specifically circulate the flow of the electrolyte around the anode and to provide positive pressure to force the electrolyte out of the apertures in the device. After metal deposition on the cathode master was completed for each of the samples, they were removed and allowed to dry and measured without transfer from the cathodes.

The circuit made in this example was designed for utilization with a computer and was of the kind illustrated in FIG. 7. This circuit was composed of two types of lines referred to as digit lines and sense lines. The lines are positioned in the circuit to form three line groups. The two outside lines of said group are digit lines which are joined at both ends of the circuit. The sense lines are unconnected to the two digit lines and disposed between them. When placed in a computer circuit, the sense lines are connected to both a Permalloy (iron nickel alloy) memory element and a high gain amplifier. When output is desired, it travels from the memory elements to the amplifier along the sense lines. The digit lines are also connected to the memory elemet. Digit lines are used for input. After output, the memory element in this particular computer is erased and is replenished by the same or a different input from an input source to the memory element along the digit lines.

Uniformity of resistance with no bridging between the lines is essential for proper computer performance. In order to compare the three samples, five measurements of thickness were taken along the length of each of three sets of lines for each circuit. One of the three sets was toward the top of the circuit, one toward the bottom, and one in the middle. Therefore, fifteen measurements of digit lines and fifteen measurements for sense lines were taken throughout each sample circuit. The circuit was 29.13 cm. long and 5.97 cm. wide and contained 48 sets of lines. The desired thickness for both digit and sense lines was to be no greater than .0178 mm. The data from the measurement of the samples is indicated in the table below in mm.

| | With device | | With mask | | No device or mask | |
|---|---|---|---|---|---|---|
| | Digit | Sense | Digit | Sense | Digit | Sense |
| Measurement number: | | | | | | |
| 1 | .0152 | .0152 | .0254 | .0203 | .0229 | .0203 |
| 2 | .0152 | .0140 | .0203 | .0203 | .0178 | .0152 |
| 3 | .0152 | .0152 | .0229 | .0216 | .0178 | .0165 |
| 4 | .0152 | .0152 | .0229 | .0216 | .0178 | .0178 |
| 5 | .0152 | .0127 | .0330 | .0254 | .0305 | .0305 |
| 6 | .0152 | .0127 | .0190 | .0152 | .0203 | .0165 |
| 7 | .0140 | .0127 | .0178 | .0152 | .0152 | .0127 |
| 8 | .0140 | .0127 | .0165 | .0165 | .0152 | .0127 |
| 9 | .0140 | .0127 | .0229 | .0152 | .0165 | .0127 |
| 10 | .0140 | .0127 | .0280 | .0140 | .0203 | .0178 |
| 11 | .0152 | .0152 | .0240 | .0240 | .0216 | .0203 |
| 12 | .0152 | .0152 | .0240 | .0216 | .0190 | .0178 |
| 13 | .0140 | .0152 | .0240 | .0203 | .0178 | .0178 |
| 14 | .0152 | .0152 | .0229 | .0216 | .0178 | .0165 |
| 15 | .0140 | .0127 | .0305 | .0267 | .0254 | .0216 |
| Maximum variation in thickness | .00127 | .00254 | .0165 | .0127 | .0153 | .0178 |

This data indicates the unique uniformity obtained when the process of this invention is used. The variation in sense line thickness in the prior art process was five times greater than the variation resulting when the process of this invention was used. The variation in digit line thickness was ten times greater in the prior art process than the variation resulting when the process of this invention was used.

The advantages of this invention are obvious. Not only can better circuits be made but smaller printed circuits having finer lines and less space between the lines may now be made by utilization of the teachings of this invention.

What is claimed is:

1. An apparatus for electrodepositing a uniform layer of metal on closely spaced multiple circuit lines having layers of insulation located therebetween and operable when placed in an electroplating solution comprising:

a cathode master of predetermined shape suitable for placing in an electroplating solution, said cathode master comprising an electrical circuit having an insulated area for preventing electrodeposition of metal thereon and a conducting area which comprises a set of conducting lines for depositing metal thereon, said conducting lines located as conducting islands in said insulated area;

an anode located in said electroplating solution;

an anode housing spacedly surrounding said anode, said anode housing comprising a first anode housing section and a second anode housing section, each of said first and said second sections having a dielectric ion flow directional region and means for directing an electroplating solution into said anode housing, said first anode housing section having the cross sectional shape of a polygon, said first anode housing section comprising a back wall, a first side wall, a second side wall, a front wall, and a bottom member connecting said back wall to said first side wall, said second side wall and said front wall, said second anode housing section having the cross section shape of a polygon, said second anode housing section including a back wall, a first side wall, a second side wall and a front wall that coact to form slideable engagement with the corresponding walls of said first anode housing section; said first anode housing section and said second anode housing section coacting to produce a dielectric ion flow directional device which includes a perforate area for directing ion flow toward said cathode, said perforate area comprising at least three walls of said first anode housing section, and at least three walls of said second anode housing section, said perforate area directionally orientated toward said cathode, said perforated area further tailorable to the shape of said cathode by closing off portions of said perforated area, said anode housing perforate area being less than said conducting area of said cathode so that the conducting area can receive a uniform layer of material.

References Cited

UNITED STATES PATENTS

| | | | |
|---|---|---|---|
| 1,700,178 | 1/1929 | Porzel | 204—Dig. 7 |
| 3,271,290 | 9/1966 | Pianowski | 204—222 |
| 2,702,260 | 2/1955 | Massa | 204—273 |
| 2,675,348 | 4/1954 | Greenspan | 204—Dig. 7 |

GERALD L. KAPLAN, Primary Examiner

W. I. SOLOMON, Assistant Examiner

U.S. Cl. X.R.

204—4, 222, 269, 273, Dig. 7